(12) United States Patent
Schoenfelder

(10) Patent No.: US 12,244,980 B2
(45) Date of Patent: Mar. 4, 2025

(54) COMMUNICATIONS PANEL WITH SELECTABLE CABLE ENTRY

(71) Applicant: COMMSCOPE TECHNOLOGIES LLC, Hickory, NC (US)

(72) Inventor: Rodney C. Schoenfelder, Shakopee, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 189 days.

(21) Appl. No.: 17/917,226

(22) PCT Filed: Apr. 8, 2021

(86) PCT No.: PCT/US2021/026439
§ 371 (c)(1),
(2) Date: Oct. 5, 2022

(87) PCT Pub. No.: WO2021/207534
PCT Pub. Date: Oct. 14, 2021

(65) Prior Publication Data
US 2023/0156377 A1    May 18, 2023

Related U.S. Application Data

(60) Provisional application No. 63/081,038, filed on Sep. 21, 2020, provisional application No. 63/007,594, filed on Apr. 9, 2020.

(51) Int. Cl.
*G02B 6/44* (2006.01)
*G02B 6/36* (2006.01)
(Continued)

(52) U.S. Cl.
CPC .......... *H04Q 1/021* (2013.01); *G02B 6/3624* (2013.01); *H04Q 1/06* (2013.01)

(58) Field of Classification Search
CPC .................... G02B 6/4478; G02B 6/44785; G02B 6/4453; G02B 6/4455
See application file for complete search history.

(56) References Cited

U.S. PATENT DOCUMENTS 5,835,660 A * 11/1998 Jung ................... G02B 6/4471
385/137
6,944,383 B1   9/2005 Herzog et al.
(Continued)

FOREIGN PATENT DOCUMENTS

WO    2018/141844 A2    8/2018

OTHER PUBLICATIONS

Extended European Search Report for Application No. 21785592.3 mailed Apr. 11, 2024.
(Continued)

*Primary Examiner* — Rhonda S Peace
(74) *Attorney, Agent, or Firm* — Merchant & Gould P.C.

(57) ABSTRACT

A pivoting mounting bracket enables a user to select a cable entry direction for a pre-cabled chassis. The cable can be anchored to the mounting bracket prior to selecting the cable entry direction. A cable guide may protect against overbending of the cable during pivoting of the mounting bracket. Certain types of chassis can be pre-cabled with at least 576 or even at least 864 optical fibers within a 5 RU space. Certain types of chassis can include a v-shaped panel to hold front ports (e.g., optical adapters).

26 Claims, 16 Drawing Sheets

(51) Int. Cl.
   *H04Q 1/02* (2006.01)
   *H04Q 1/06* (2006.01)

(56) References Cited

U.S. PATENT DOCUMENTS

| | | | |
|---|---|---|---|
| 7,350,980 B2* | 4/2008 | McCormack | G02B 6/4478 |
| | | | 385/94 |
| 9,212,765 B1 | 12/2015 | Chia et al. | |
| 9,386,723 B2* | 7/2016 | Kostecka | H05K 5/0217 |
| 10,302,888 B2 | 5/2019 | Taylor et al. | |
| 11,462,897 B2* | 10/2022 | Marchek | F16L 3/04 |
| 2009/0238533 A1 | 9/2009 | Stansbury et al. | |
| 2011/0228473 A1* | 9/2011 | Anderson | H05K 7/1401 |
| | | | 361/679.02 |
| 2016/0116697 A1 | 4/2016 | Kostecka et al. | |
| 2017/0006722 A1 | 1/2017 | Kostecka et al. | |
| 2017/0118863 A1 | 4/2017 | Miwa | |
| 2017/0199346 A1 | 7/2017 | Montgelas et al. | |
| 2023/0156377 A1* | 5/2023 | Schoenfelder | H04Q 1/021 |
| | | | 385/135 |

OTHER PUBLICATIONS

International Search Report and Written Opinion of the International Searching Authority for International Patent Application No. PCT/US2021/026439 mailed Jul. 26, 2021, 11 pages.
SU HCF High Capacity Frame for Direct Pass Through Patching, Datasheet, AFL Hyperscale, 1-4 (Sep. 2019).

\* cited by examiner

COMMUNICATIONS PANEL WITH SELECTABLE CABLE ENTRY

CROSS-REFERENCE TO RELATED APPLICATIONS

This application is a National Stage Application of PCT/US2021/026439, filed on 8 Apr. 2021, which claims the benefit of U.S. Patent Application Ser. No. 63/007,594, filed on Apr. 9, 2020, and claims the benefit of U.S. Patent Application Ser. No. 63/081,038, filed on Sep. 21, 2020, the disclosures of which are incorporated herein by reference in their entireties. To the extent appropriate, a claim of priority is made to each of the above disclosed applications.

BACKGROUND

Many local area networks and telecommunication systems utilize termination panels to provide cross-connection between telecommunications equipment. Termination panels typically include front and rear connections. Equipment and cable management devices are often located adjacent to the termination panels. Termination panels are routinely mounted between rack elements with one or more feeder cables routed to the rear of the panels while patch cables are routed to available ports at the front of the panels. The feeder cables can be anchored at the rear of the termination panels.

Improvements are desired.

SUMMARY

Some aspects of the disclosure are directed to a communication panel including a chassis defining a cable entrance location through which one more cables extend into an interior of the chassis. A cable anchor station is disposed at the cable entrance location to anchor the one or more cables. The cable anchor station can be switched between at least two configurations. In the first configuration, the cable anchor station defines a first cable routing path extending to the cable entrance location in a first direction. In the second configuration, the cable anchor station defines a second cable routing path extending to the cable entrance location in a second direction that is different from the first direction.

In certain implementations, the second direction is opposite the first direction. In certain examples, the first cable routing path extends along part of a rear of the chassis from the cable entrance location to a first side of the chassis; the second cable routing path extends along another part of the rear of the chassis from the cable entrance location to an opposite, second side of the chassis.

In certain implementations, the cable anchor station includes a pivoting mounting bracket that carries one or more cable anchor members. In certain examples, the mounting bracket carries one or more cable clamps. In certain examples, the mounting bracket pivots relative to the chassis between first and second mounting positions. The mounting bracket is disposed in the first mounting position in the first configuration of the cable anchor station and is disposed in the second mounting position in the second configuration of the cable anchor station.

In certain implementations, a cable guide extends into the chassis from the cable entrance location. The cable guide provides bend radius limiting protection to the cable. The cable guide protects overbending of the cable while changing between the first and second configurations of the cable anchor station. In certain examples, the cable guide enables sliding of the cable through the cable guide during pivoting of the mounting bracket of the cable anchor station.

In certain implementations, the chassis is pre-cabled at a factory so that connectorized ends of the cable are plugged into internal ports of the chassis and the cable extends out the rear of the chassis. The cable is pre-anchored to a mounting bracket at the factory. The mounting bracket is movable relative to the chassis along a controlled path during installation of the chassis at an installation location remote from the factory. The mounting bracket can be secured relative to the chassis at two or more positions along the controlled path.

In certain implementations, the controlled path defines an arc. In certain implementations, the mounting bracket pivots along the controlled path. In certain implementations, the controlled path extends along a plane parallel with a bottom of the chassis (e.g., a horizontal plane). In certain implementations, the mounting bracket can be secured at two oppositely facing positions along the controlled path.

In certain implementations, pre-cabling the chassis at the factory allows the chassis to hold the internal ports in a dense configuration that need not provide finger access to the user for each internal port. Accordingly, pre-cabling the chassis at the factory allows a 5RU chassis to hold at least 432, 576, 864, or more internal ports.

Pre-anchoring an optical cable to the mounting bracket protects the pre-cabled optical fibers within the chassis. Pre-anchoring the cable inhibits the fibers from being pulled out of the internal ports during shipping or installation of the chassis. In certain examples, because the optical cable in anchored at the factory, the terminated fibers of the cable can be routed within the chassis as bare fibers, which provides space for a larger number of optical fibers to extend within the chassis compared to buffered or upjacketed fibers.

Other aspects of the disclosure are directed to a communication panel including a chassis holding at least 576 front ports within a 5 RU footprint. In certain implementations, the chassis holds at least 864 front ports. In certain examples, the front ports are optical ports. In certain examples, the front ports include LC ports.

Other aspects of the disclosure are directed to a communication panel including an angled frame. The frame has a first section extending from a first side towards a forward apex and a second section extending from an opposite second side towards the forward apex. Each of the sections of the frame is angled relative to an open front of the chassis.

In certain implementations, each section of the frame defines a plurality of elongate apertures. One or more groups of adapters can be mounted within respective ones of the apertures. In certain examples, two columns or two rows can be disposed within each aperture. In certain examples, the apertures of the first section are offset vertically (e.g., towards a top or bottom of the chassis) relative to the apertures of the second section.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
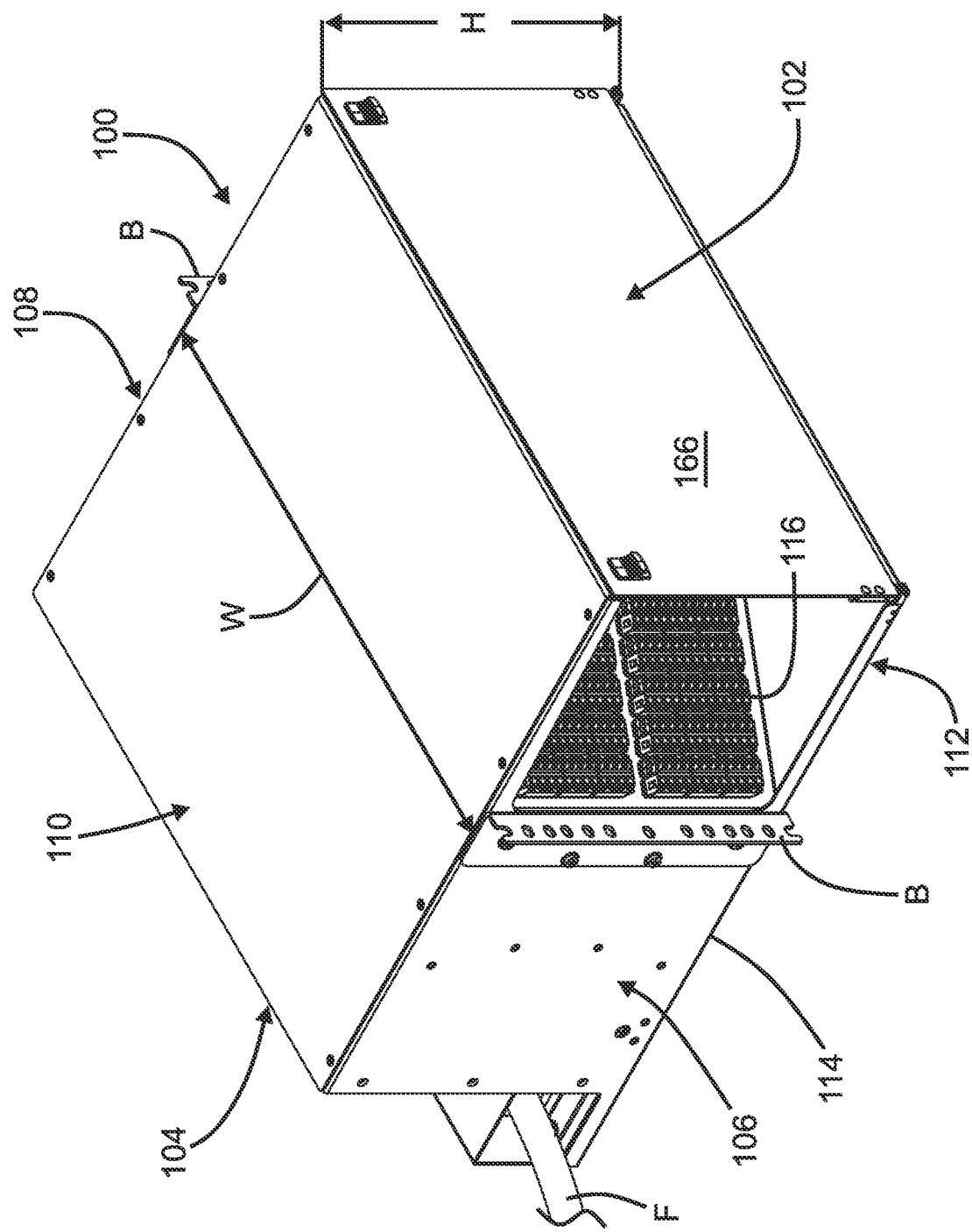
FIG. 1 is a front perspective view of an example communications panel including a chassis holding a plurality of front ports.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a communications panel 100 (e.g., for telecommunications) including a chassis 114 that mounts to a standard rack (e.g., in a data center). For example, brackets B may be disposed at opposite first and second sides 106, 108 of the chassis 114 to attach the chassis 114 to the rack. The chassis 114 extends along a depth D between a front 102 and a rear 104, along a width W between the opposite sides 106, 108, and along a height H between a top 110 and a bottom 112. Front ports 116 are accessible from the front 102 of the chassis 114. A cable entrance location 118 (FIG. 4) is disposed at the rear 104 of the chassis 114.

Figure 5:
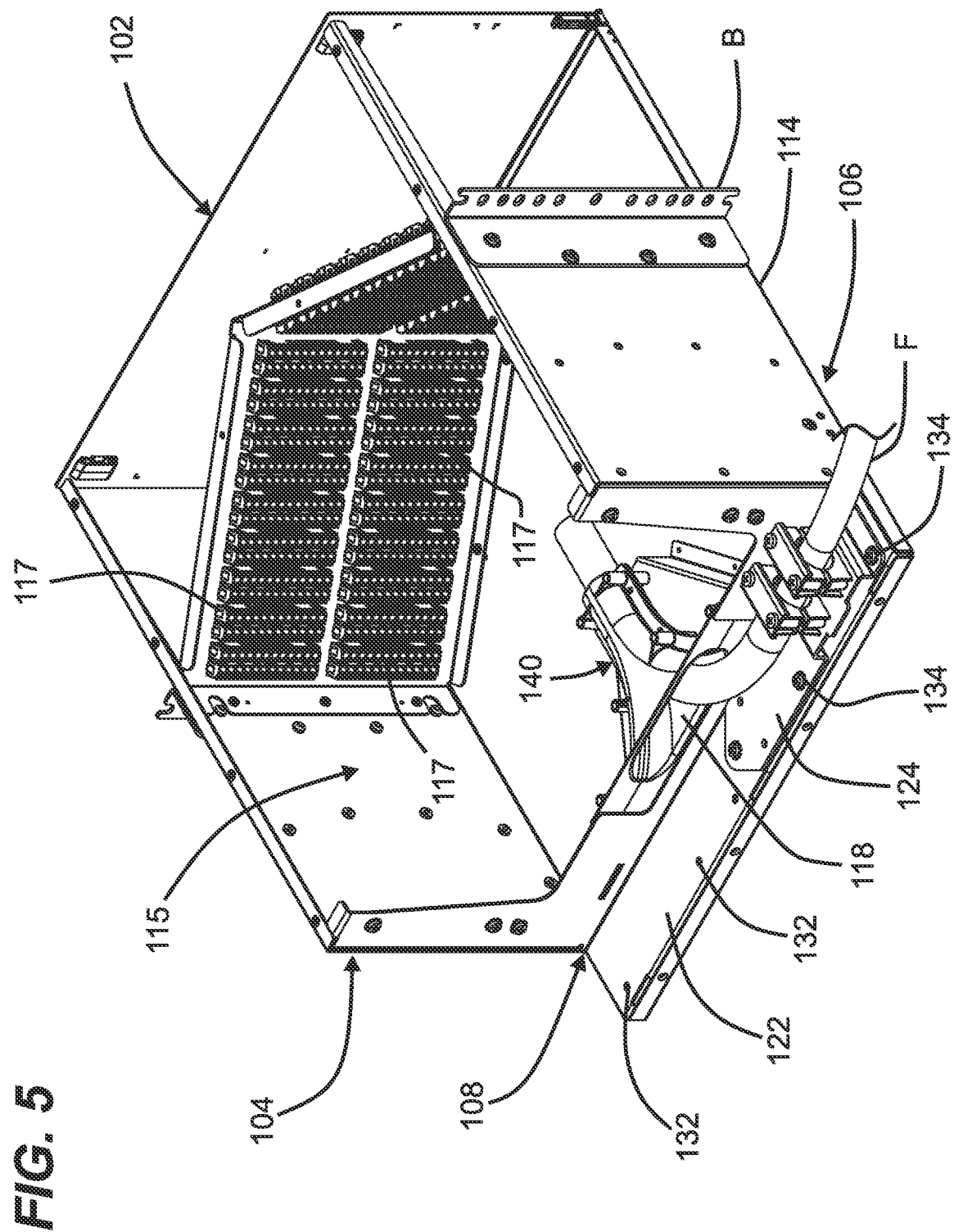
FIG. 5 shows a top portion of the chassis removed from a remainder of the chassis for ease in viewing an interior of the communications panel of FIG. 4, the cable anchor station receiving the feeder cable along a first cable routing path.
Figure 6:
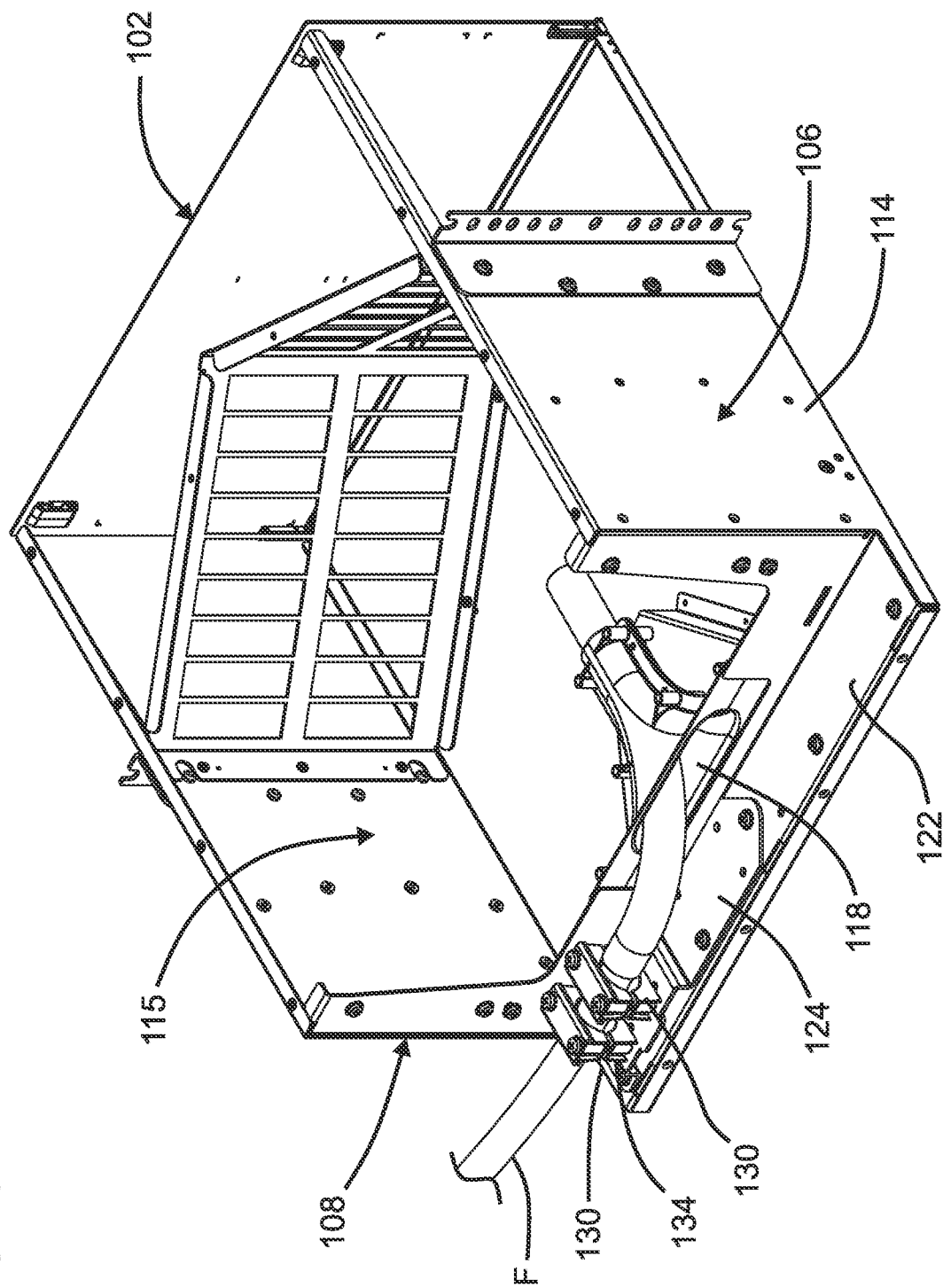
FIG. 6 shows the cable anchor station receiving the feeder cable along a second cable routing path that extends in an opposite direction than the first cable routing path.
Figure 13:
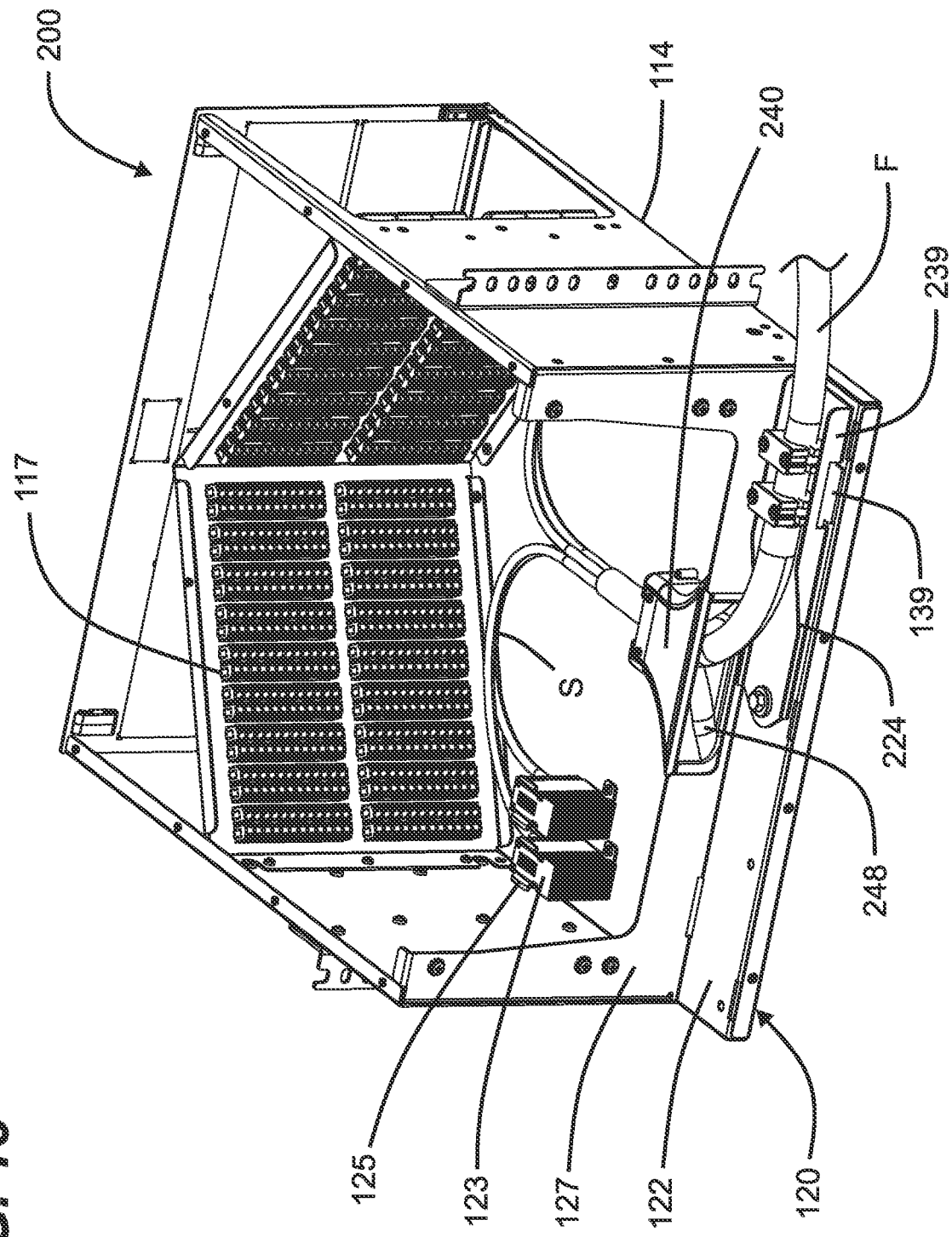
FIG. 13 shows a top portion of the chassis removed from a remainder of the chassis for ease in viewing an interior of the communications panel of FIG. 12 and a second example fiber guide, the cable anchor station receiving the feeder cable along the first cable routing path.

A feeder cable F can enter an interior 115 (FIG. 5) of the chassis 114 through the cable entrance location 118. Connectorized ends of the feeder cable F plug into internal ports 117 of the chassis 114 so that signals carried by the feeder cable F are made accessible to cables (e.g., patch cables) that plug into the front ports 116. In certain examples, fibers of the feeder cable F are separated from each other at one or more fanouts 123 disposed within the chassis 114 (e.g., see FIG. 13). In certain examples, the fanouts 123 can be stacked at fanout holders 125 (FIG. 13). In certain examples, the fanout holders 125 are disposed at opposite sides of the interior of the chassis 114.

In certain implementations, groups S of fibers of the feeder cable F can be separated out after extending through the cable entrance location and routed to respective fanout holders 125 (e.g., see FIG. 13). In certain examples, the groups S are routed from the fiber guide 140, 240, towards the ports 117, and looped back towards the fanouts holders 125. Connectorized ends of the fibers are routed from the fanouts 123, towards a rear wall 127 of the chassis 114, and then looped back towards the internal ports 117.

Figure 4:
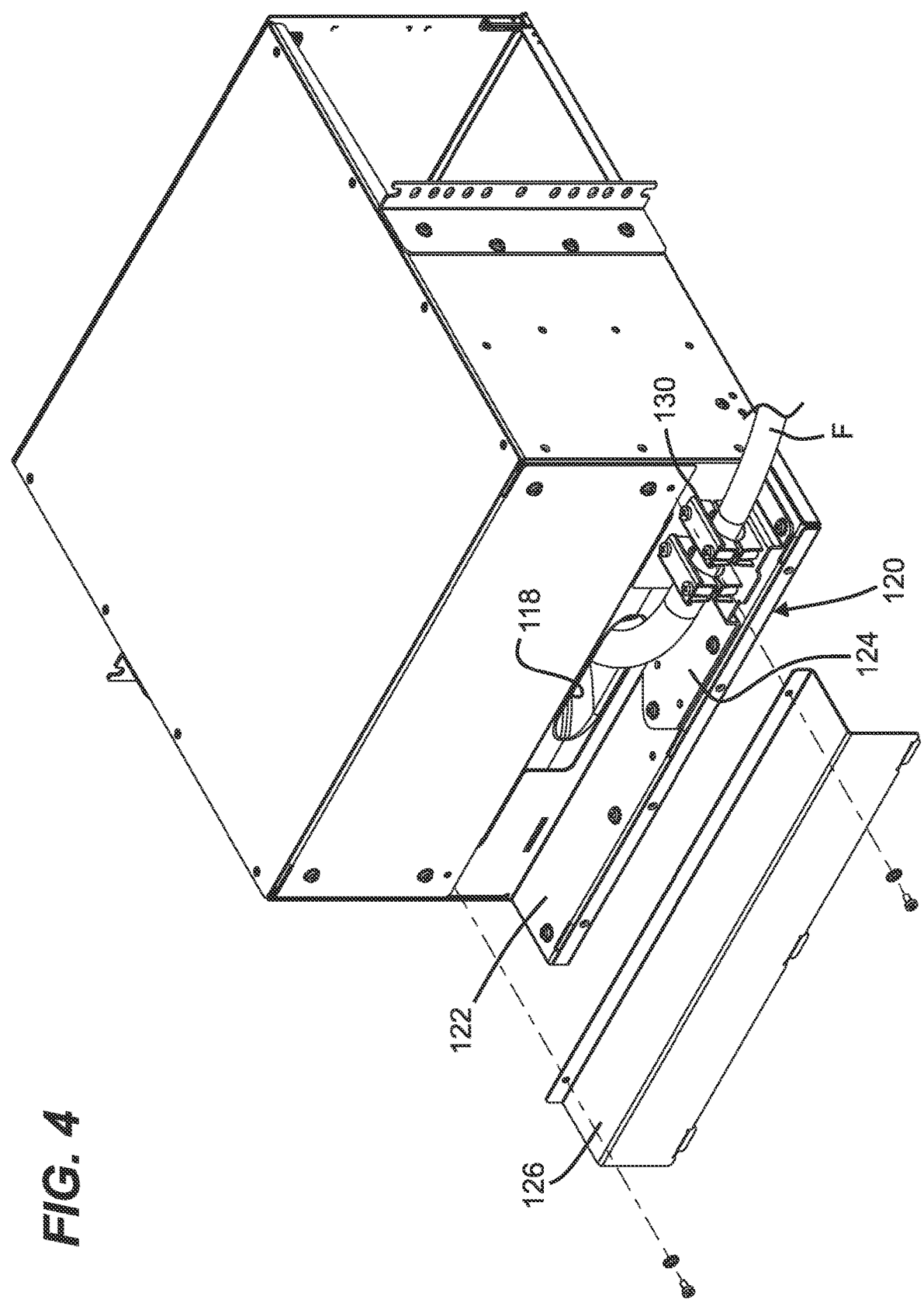
FIG. 4 shows a cover exploded from a cable anchor station of the communications panel of FIG. 3.
Figure 12:
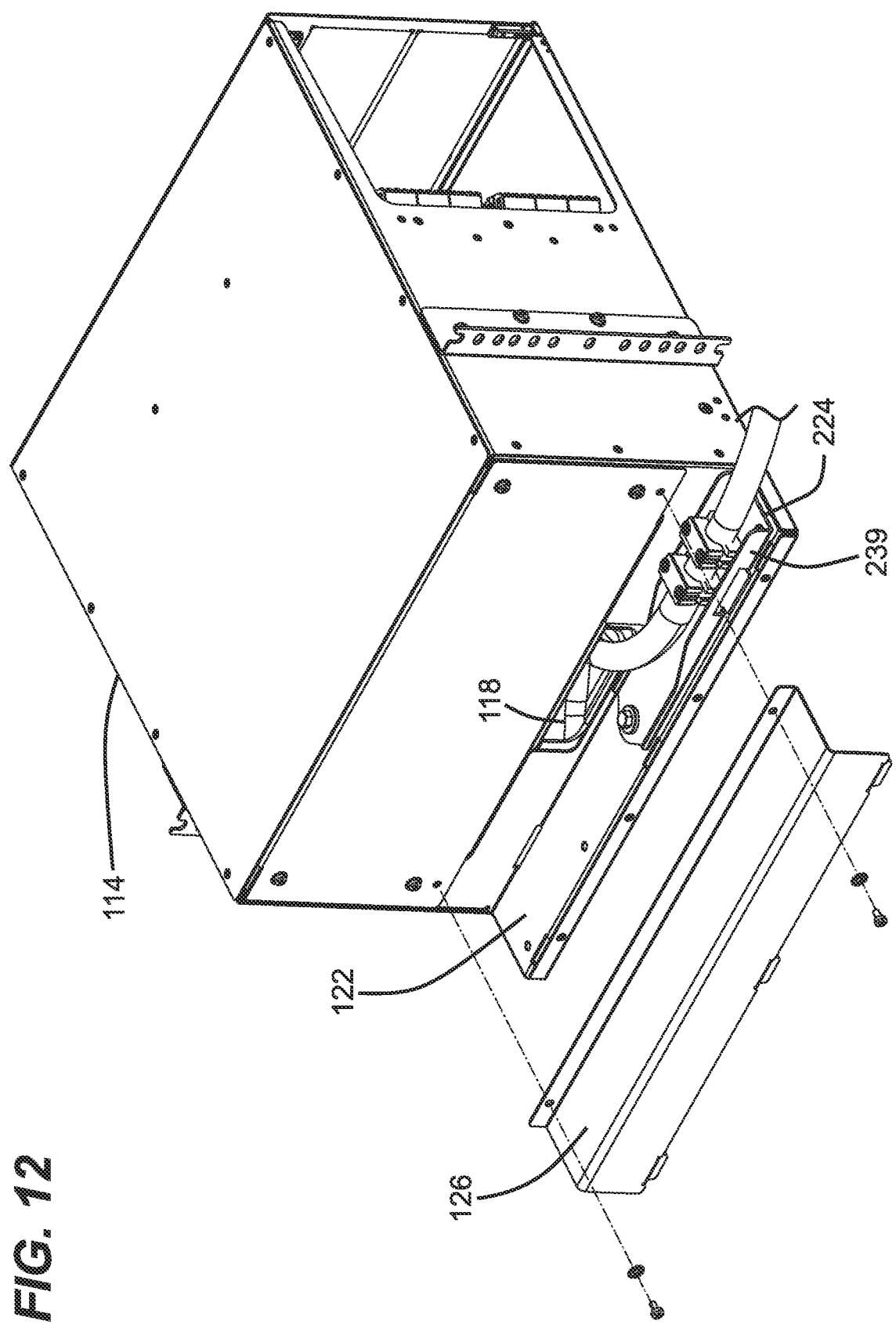
FIG. 12 shows a cover exploded from the cable anchor station of the communications panel of FIG. 3 to expose a second mounting bracket.

In certain implementations, an anchoring station 120 is disposed at the rear 104 of the chassis 114 (e.g., see FIGS. 4 and 12). The anchoring station 120 secure the feeder cable F to the chassis 114 to inhibit pulling on the connectorized ends plugged into the internal ports 117. One or more anchor members 130 are disposed at the anchor station 120 to retain the feeder cable F at the chassis 114. For example, one or more cable clamps 130 can be disposed at the anchor station 120. An end portion of the feeder cable F extends from the one or more anchor members 130 to the cable entrance location 118 at the rear 104 of the chassis 114.

In certain implementations, the one or more anchor members 130 are coupled to a mounting bracket 124, 224 that is movable relative to the chassis 114 to carry the anchor members 130 between at least two configurations. In the first configuration, the anchor members 130 are positioned relative to the chassis 114 to define a first cable routing path extending in a first direction to the cable entrance location 118 (e.g., see FIG. 5). In the second configuration, the anchor members 130 are positioned relative to the chassis 114 to define a second cable routing path extending in a different, second direction to the cable entrance location 118 (e.g., see FIG. 6). FIGS. 4-8 illustrate a first example implementation of the mounting bracket 124. FIGS. 12-15 illustrate a second example implementation of the mounting bracket 224.

Advantageously, the feeder cable F can be pre-anchored to the mounting bracket 124, 224 at a factory during cabling of the chassis 114. Pre-anchoring the cable F allows the internal ports 117 of the chassis 114 to be populated in the factory. An end user then installs the pre-populated chassis 114 and pre-anchored feeder cable F at an installation site. The anchor members 130 protect the connectorized ends of the cable F from pulling out of the internal ports 117 during shipping and/or installation. The movable mounting bracket 124, 224 allows the end user to select which cable routing path is desirable from the feeder cable F. For example, the movable mounting bracket 124, 224 allows the pre-anchored feeder cable F to be routed to the cable entrance location 118 from the first side 106 of the chassis 114 or from the second side 108 of the chassis 114.

The mounting bracket 124, 224 carries the anchor members 130 along a controlled path P (FIG. 7) as the mounting bracket 124, 224 moves relative to the chassis 114. In certain examples, the mounting bracket 124, 224 is pivotally mounted to the support ledge 122 to move along an arc-shaped path P. In certain examples, a pivot axis A of the mounting bracket 124, 224 extends parallel with the height H of the chassis 114. One or more pre-determined mounting positions are disposed along the controlled path P. The mounting bracket 124, 224 can be secured (i.e., locked) relative to the chassis 114 in any of the pre-determined mounting positions. In some examples, the pre-determined mounting positions include fastener apertures 132 at which fasteners 134 extending through the mounting bracket 124, 224 can be received. In other examples, other securement mechanisms (e.g., latches, catch surfaces, etc.) are disposed at the pre-determined mounting positions.

In certain implementations, the anchor station 120 includes a support ledge 122 that extends outwardly from the chassis 114. In certain implementations, the mounting bracket 124, 224 is coupled to the support ledge 122. In certain examples, the pivot axis A extends through the support ledge 122. In certain implementations, a cover 126 can be mounted to the support ledge 122 to cover the end portion of the feeder cable F. The cover 126 may cooperate with the ledge 122 to form a passage extending between opposite side openings 128. The mounting bracket 124, 224 can be positioned relative to the support ledge 122 to define each of the first and second cable routing paths through the passage to a respective one of the side openings 128.

In certain implementations, the chassis 114 and mounting bracket 124, 224 include aligning elements that aid in securing the mounting bracket 124 to one of the pre-determined mounting positions. In certain examples, the chassis 114 defines slots 129 and the mounting bracket 124, 224 includes tabs 139 that fit within the slots 129. When the mounting bracket 124, 224 is disposed at the first pre-determined mounting position, a first of the tabs 139 extends into a first slot 129 in the rear wall of the chassis 114 (e.g., see FIG. 5). When the mounting bracket 124, 224 is disposed at the second pre-determined mounting position, a second of the tabs 139 extends into a second slot 129 in the rear wall of the chassis 114 (e.g., see FIG. 6). Engagement between the tab 139 and the slot 129 may aid in holding the mounting bracket 124, 224 steady at the pre-determined mounting position until the mounting bracket 124, 224 can secured into position (e.g., using fasteners 134).

Figure 8:
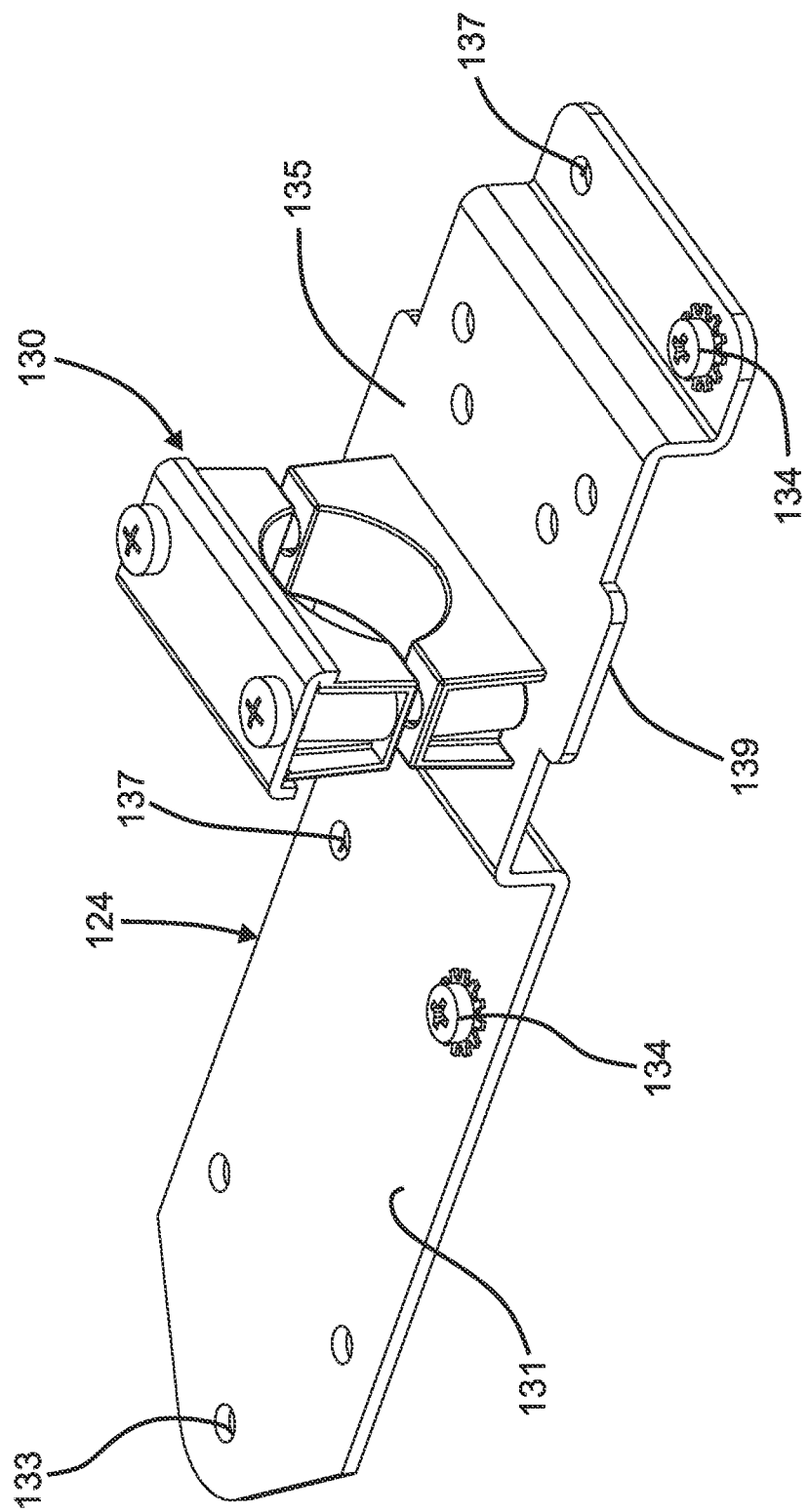
FIG. 8 is a perspective view of a first example mounting bracket suitable for use with the cable anchor station of any of the communications panels disclosed herein.

FIG. 8 illustrates the first example mounting bracket 124, which is suitable for carrying one or more anchor members 130. The mounting bracket 124 includes a body 131 configured to pivotally mount to the support ledge 122. For example, the body 131 may define an aperture 133 through which a pivot pin extends. The body 131 also includes a mounting region 135 at which the mounting members 130 are disposed. In the example shown, the mounting region 135 is raised relative to form a platform for the anchor members 130. In certain examples, the tabs 139 extend outwardly from opposite sides of the raised platform 135.

In certain implementations, the body 131 is configured to be secured in one of the pre-determined mounting positions. For example, the body 131 may define fastener apertures 137 that align with the fastener apertures 132 at the pre-determined mounting positions to allow the fasteners 134 to extend therethrough. In certain examples, the body 131 defines a first set of fastener apertures 137 that align at the first pre-determined mounting position and a second set of fastener apertures 137 that align with the second pre-determined mounting position (e.g., compare FIGS. 5 and 6).

Figure 14:
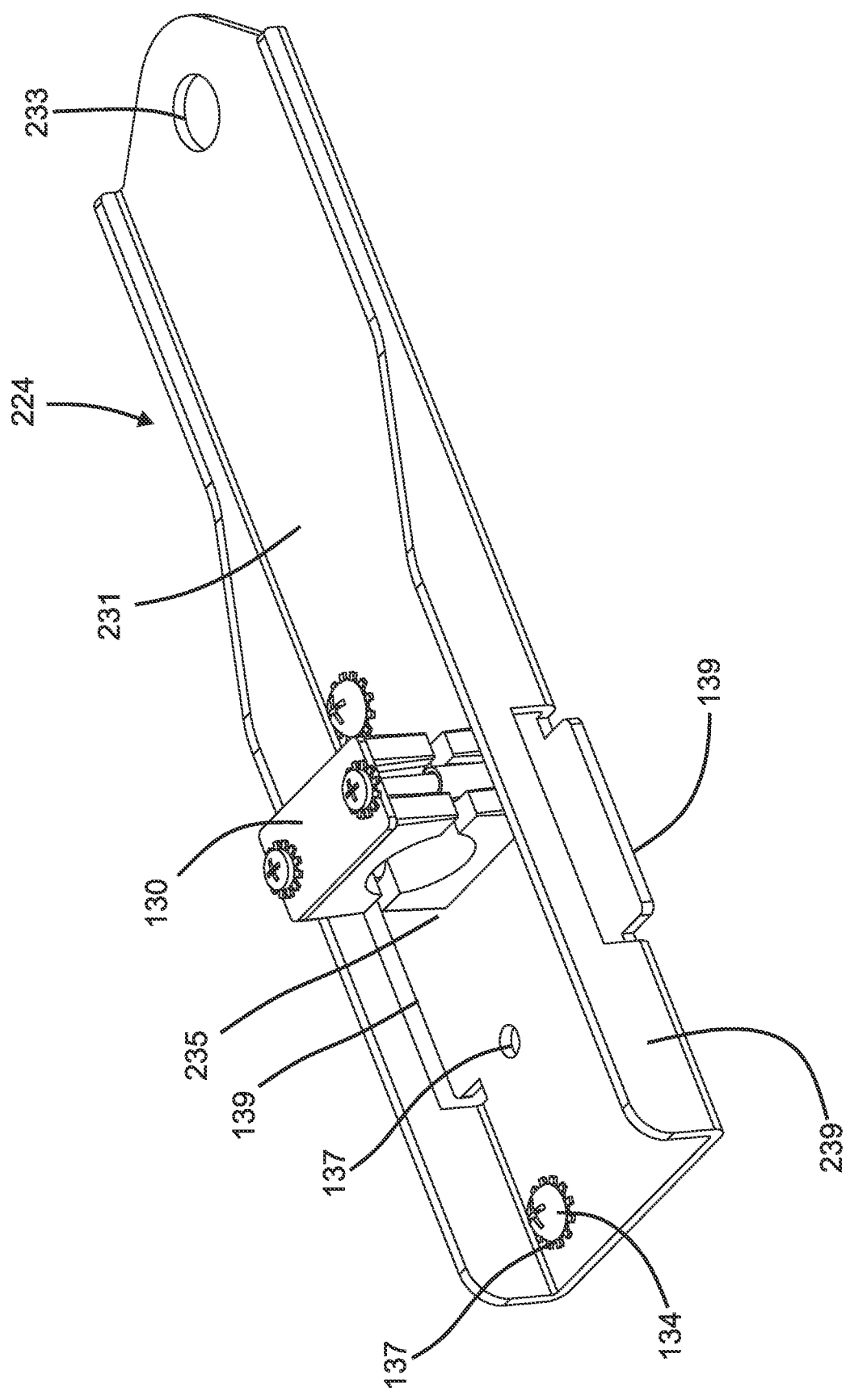
FIG. 14 is a perspective view of a second example mounting bracket suitable for use with the cable anchor station of any of the communications panels disclosed herein.

FIG. 14 illustrates the second example mounting bracket 224, which is suitable for carrying one or more anchor members 130. The mounting bracket 224 includes a body 231 configured to pivotally mount to the support ledge 122. In the example shown, the body 231 defines an aperture 233 through which a pivot pin extends. The body 231 also includes a mounting region 235 at which the mounting members 130 are disposed.

In certain implementations, the body 231 is configured to be secured in one of the pre-determined mounting positions. For example, the body 231 may define fastener apertures 137 that align with the fastener apertures 132 at the pre-determined mounting positions to allow the fasteners 134 to extend therethrough. In certain examples, the body 231 defines a first set of fastener apertures 137 that align at the first pre-determined mounting position and a second set of fastener apertures 137 that align with the second pre-determined mounting position.

In certain examples, the body 231 includes a planar surface extending along a length of the body 231 from the aperture 233, past the mounting region 235, to the fastener apertures 137. In certain implementations, the body 231 includes opposing sidewalls 239 that extend along the length of the body 231. The sidewalls 239 may aid in retaining the fibers and/or cable on the mounting bracket 224 during movement of the mounting bracket 224. In certain examples, the tabs 139 extend laterally outwardly beyond the sidewalls 239.

Figure 7:
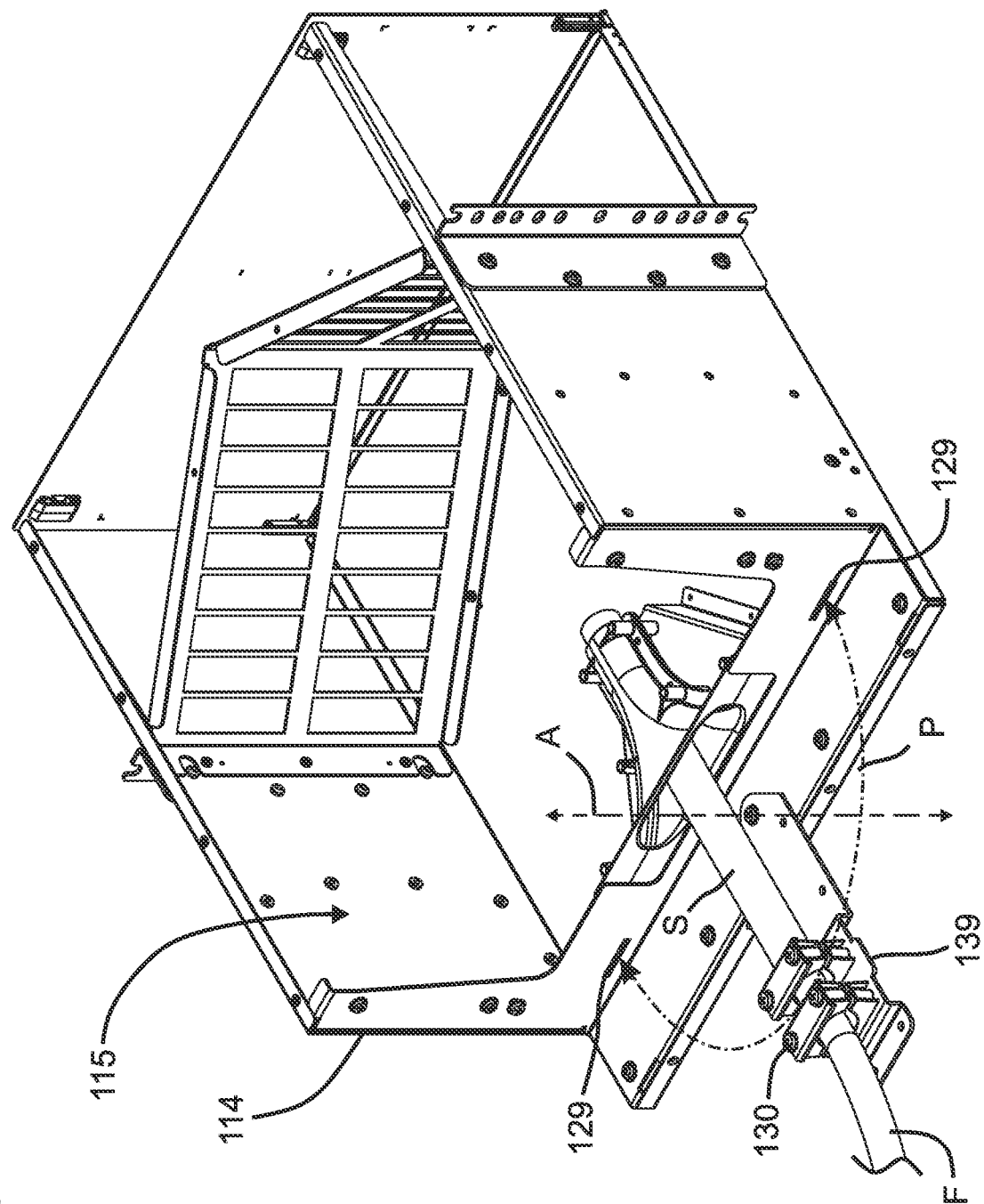
FIG. 7 shows the feeder cable anchored to a mounting bracket moving along a controlled path between two predetermined mounting positions.

Referring to FIG. 7, in certain implementations, the anchor members 130 (e.g., cable clamps) are secured to a jacketed portion of the feeder cable F. The jacket may be removed from the end portion of the cable F extending from the anchor members 130 into the chassis 114. In some implementations, the end portion of the cable includes bare optical fibers. In other implementations, the end portion of the cable includes upjacketed or otherwise buffered optical fibers. In still other implementations, the end portion of the cable includes electrical wires. A protective sheath S (e.g., a mesh sleeve or corrugated tube) can be mounted over the unjacketed portion of the cable. For example, the protective sheath S can be attached to the jacketed portion of the cable F using a thermally recoverable tube. The protective sheath S inhibits damage to the unjacketed portion of the cable F as the unjacketed portion extends through the cable entrance location 118. In certain examples, the protective sheath S is more flexible than the cable jacket.

In certain implementations, the cable entrance location 118 is elongate along the width of the chassis 114. The width of the cable entrance location 118 accommodates movement of the cable F along the controlled path P. In certain implementations, the cable entrance location 118 is formed at an open end of a cable guide 140. The cable guide 140 extends into the interior 115 of the chassis 114 to guide the feeder cable F. A cable guide 140, 240 provides bend radius protection to the feeder cable F even while the pre-anchored cable is being moved with the mounting bracket 124 to a pre-determined mounting position. In particular, the cable guide 140, 240 provides bend radius protection when the cable F and anchor station 120 are disposed in the first position and provides bend radius protection when the cable F and anchor station 120 are disposed in the second position.

Figure 9:
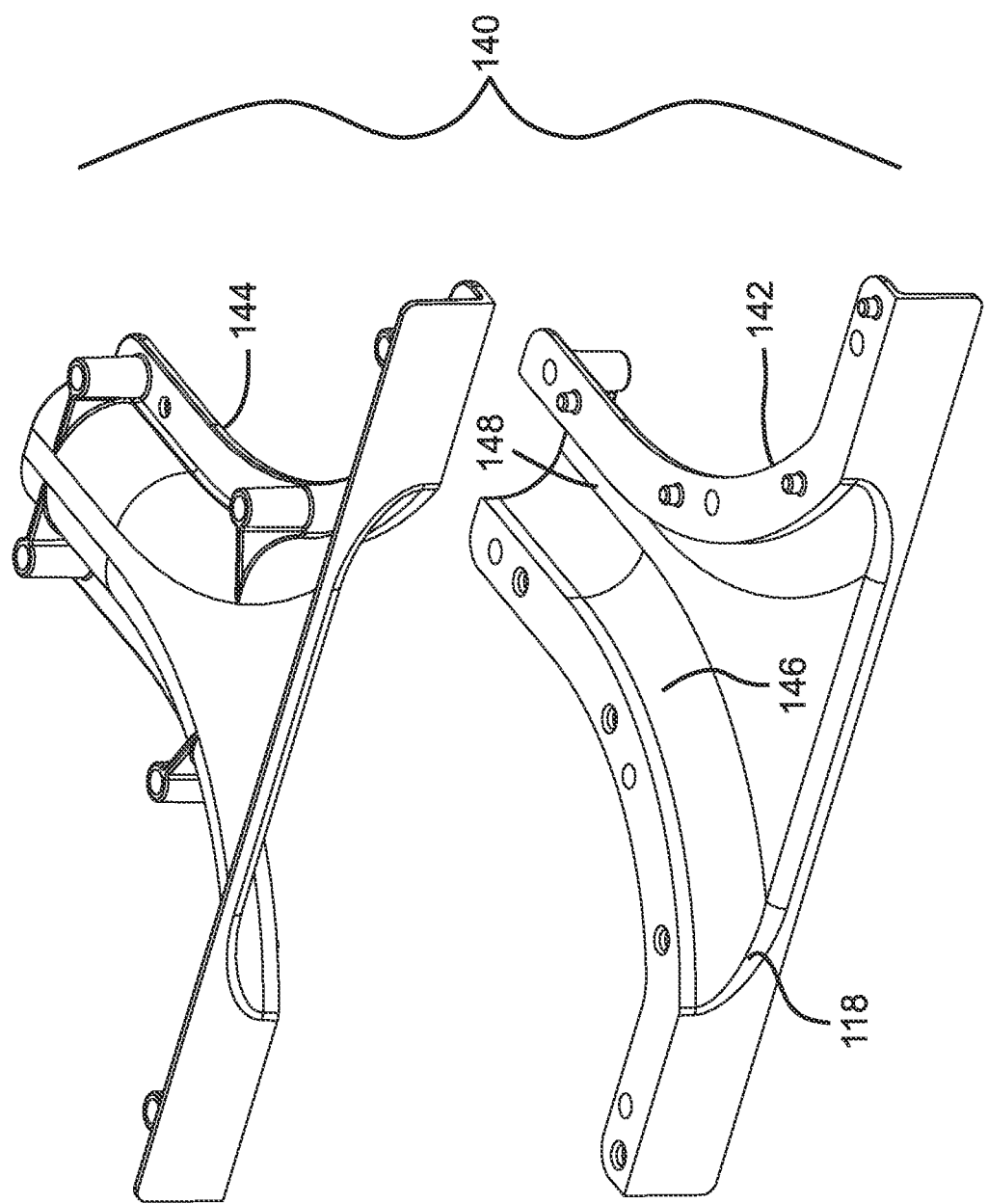
FIG. 9 is a perspective view of a first example cable guide suitable for use with any of the communications panels disclosed herein.

FIG. 9 shows an example cable guide 140 suitable for use with the chassis 114. In certain examples, the cable guide 140 includes opposing bend radius limiters 146 that protect the cable F. In certain implementations, the cable guide 140 also inhibits movement of the cable F towards the top 110 of the chassis 114. For example, the cable guide 140 may form an enclosed passage 148 through which the cable F extends. The cable guide 140 includes a first piece 142 and a second piece 144 that cooperate to define the internal passage 148. Each of the pieces 142, 144 forms part of the bend radius limiters 146. In certain examples, the cable guide 140 generally has a trumpet shape.

In certain implementations, the feeder cable F is loose within the cable guide 140. Accordingly, the feeder cable F can slide within the passage 148 of the cable guide 140 during movement of the cable bracket 124 and the anchor members 130 along the controlled path P. The mounting bracket 124 is configured so that the controlled path does not lead to sufficient sliding of the cable F to apply a pulling force on the connectorized ends disposed at the internal ports 117.

Figure 15:
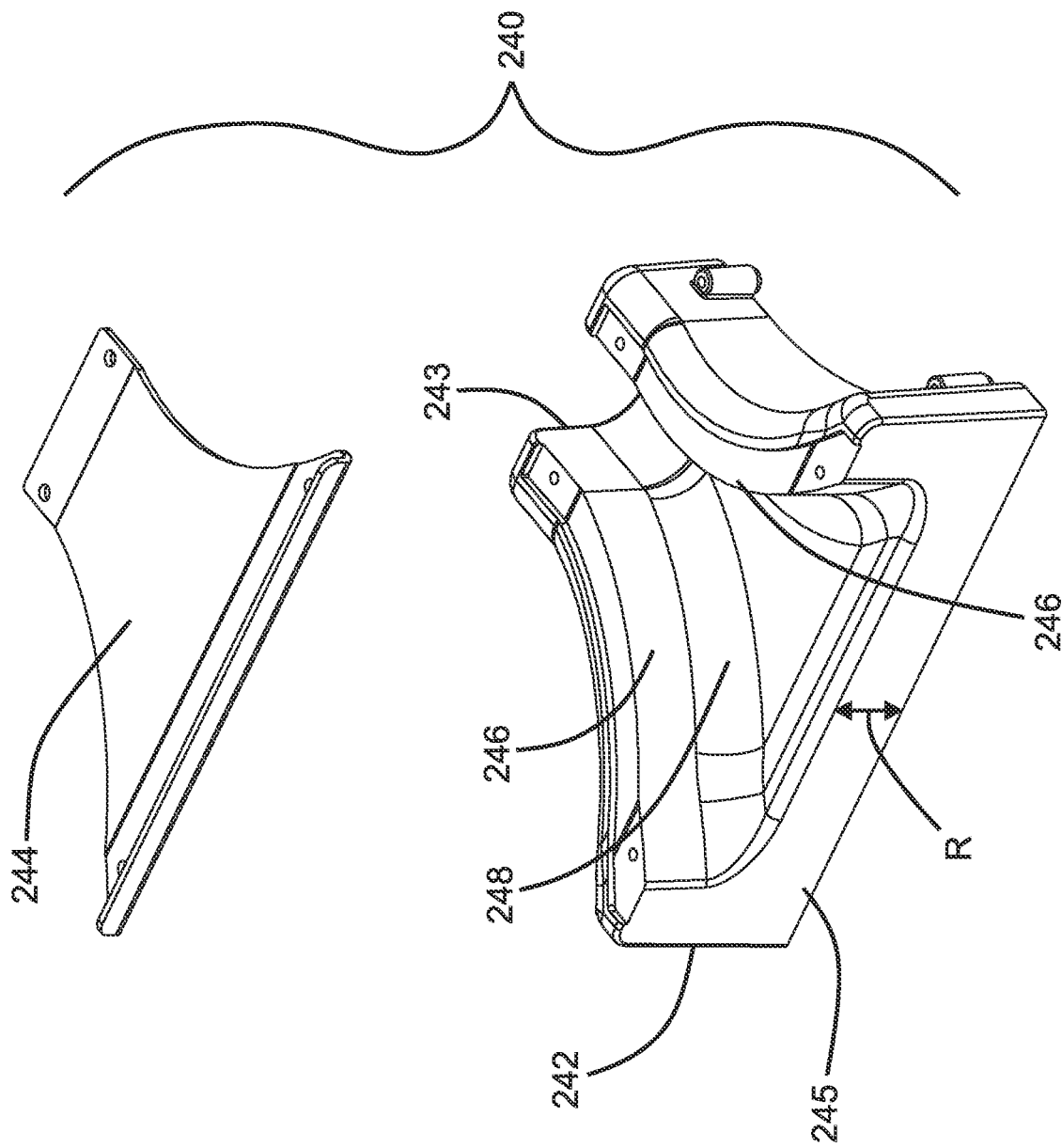
FIG. 15 is a first perspective view of a second example cable guide suitable for use with any of the communications panels disclosed herein.
Figure 16:
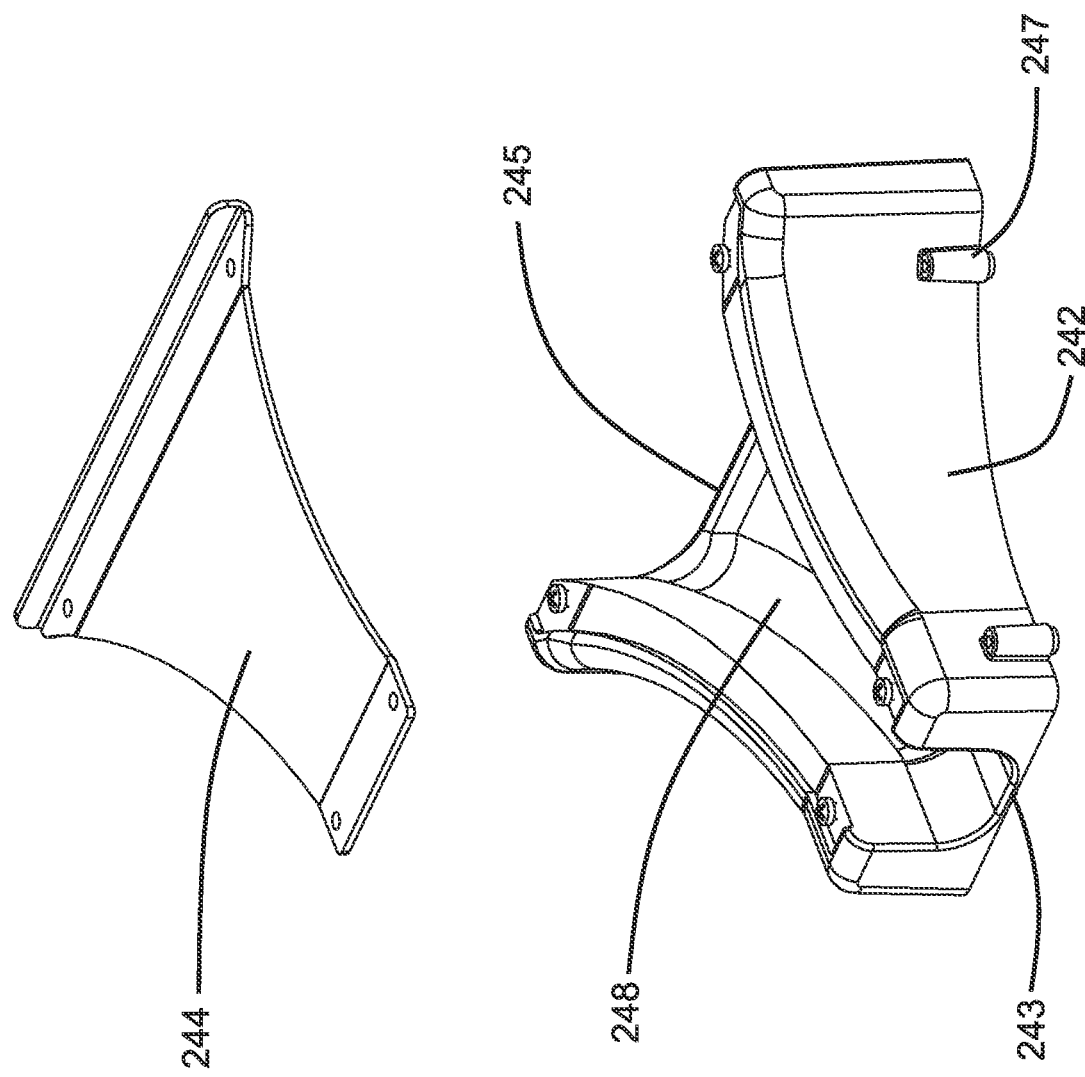
FIG. 16 is a second perspective view of the second example cable guide of FIG. 15 where the narrower end is visible.

FIG. 15 shows a second example cable guide 240 suitable for use with the chassis 114. In certain examples, the cable guide 240 includes opposing bend radius limiters 246 that protect the cable F. In certain implementations, the cable guide 240 also inhibits movement of the cable F towards the top 110 of the chassis 114. For example, the cable guide 240 may form an enclosed passage 248 through which the cable F extends. In certain examples, one axial end 243 of the passage 248 is narrower than the opposite axial end 245 of the passage 248. In the example shown, the cable guide 240 generally has a trumpet shape.

In certain implementations, the cable guide 240 routes the feeder cable F from a first height level to a second height level as the cable extends along the passage 248. For example, the wider axial end 245 of the passage 248 may be raised by a distance R relative to the narrower axial end 243. Accordingly, the raised end 245 clears a bottom portion of the rear chassis wall 127 while the narrower end 243 transitions the feeder cable F onto the bottom of the chassis 114 (e.g., see FIG. 13). Raising the wider end 245 also supports the feeder cable F as the cable anchor station 120 is transitioned between the first and second configurations, thereby inhibiting the feeder cable F from scraping over the pivot fastener.

In certain implementations, the cable guide 240 includes a first piece 242 and a second piece 244 that cooperate to define the internal passage 248. In certain examples, the bend radius limiters 246 are defined by the first piece 242. In the example shown, the first piece 242 defines an open-topped channel extending between the narrower end 243 and the wider end 245. The second piece 244 mounts to the first piece to close the open top of the channel to form the internal passage 248. In certain examples, the first piece 242 and second piece 244 are formed from different materials (e.g., the first piece 242 being formed from plastic while the second piece 244 is formed from metal).

In other implementations, opposing radius limiters can be used instead of a cable guide 140, 240. For example, a first radius limiter may extend into the chassis 114 from a rear entrance while curving in a first direction and a second radius limiter may extend into the chassis 114 from the rear entrance while curving in a second direction that is opposite the first direction. In some examples, the first and second radius limiters can be separate pieces that are separately mounted to the chassis 114. In other examples, the first and second radius limiters can be monolithically formed or separate pieces mounted to a common base.

In accordance with certain aspects of the disclosure, pre-cabling the internal ports 117 of the chassis 114 at the factory allows the chassis 114 to hold the internal ports 117 in a dense configuration that need not provide finger access to the end user for each internal port 117. Accordingly, pre-cabling the chassis 114 at the factory allows a 5RU chassis 114 to hold at least 432 internal ports 117. In certain examples, the chassis 114 can hold at least 576 internal ports 117 within a 5 RU space. In certain examples, the chassis 114 can hold at least 864 internal ports 117 within a 5 RU space (e.g., see FIG. 2).

In some implementation, the internal ports 117 are formed by optical adapters having aligned external (e.g., front) ports 116. In some examples, the internal ports 117 are single-fiber ports. In an example, the internal ports 117 are LC ports. In another example, the internal ports 117 are SC ports. In other examples, the internal ports 117 are multi-fiber ports (e.g., MPO ports). In other implementations, the internal ports 117 are electrical sockets or electrical contacts for receiving wires of the feeder cable F.

Figure 2:
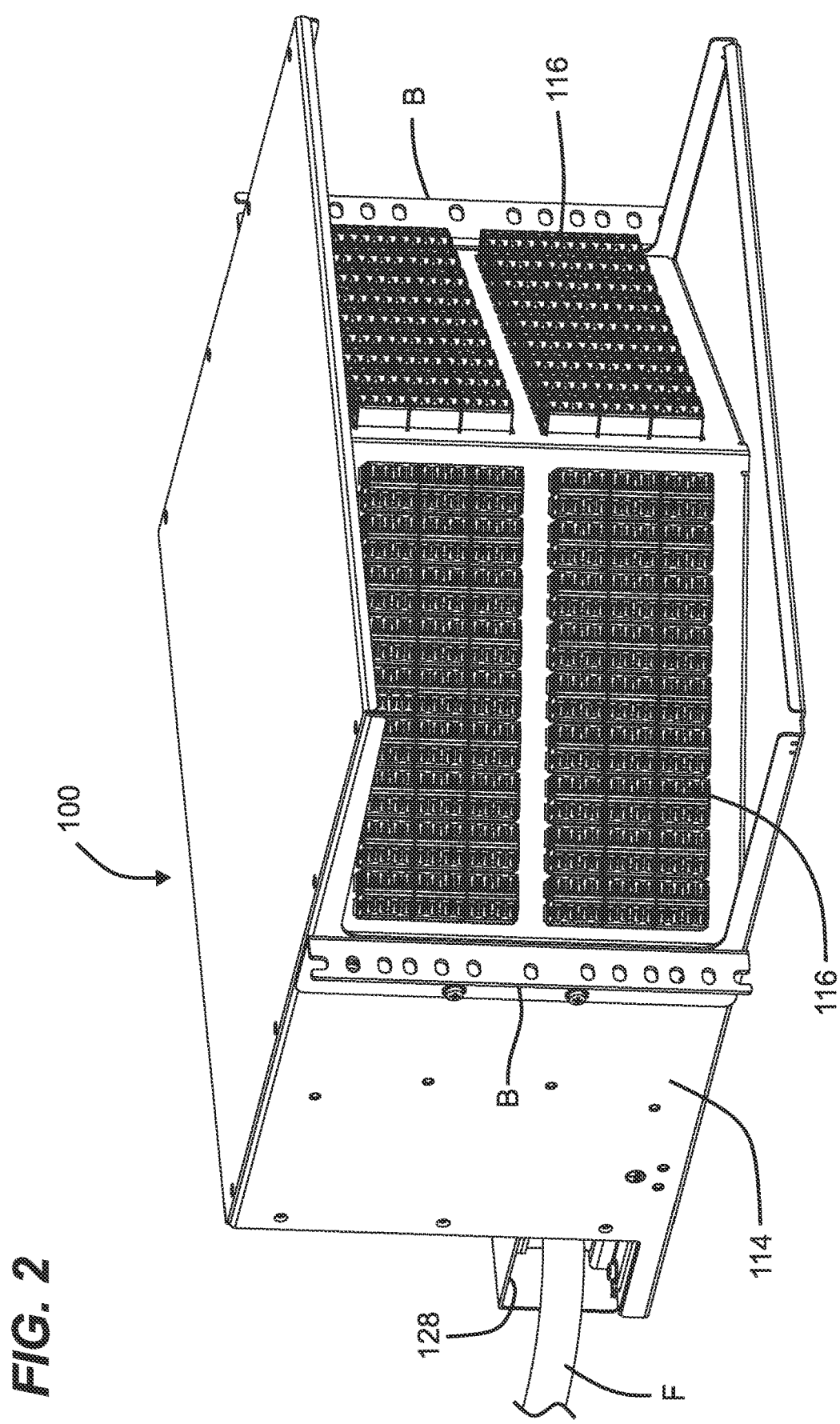
FIG. 2 is another front perspective view of the communications panel of FIG. 1 with a front cover removed for ease in viewing the front ports.
Figure 3:
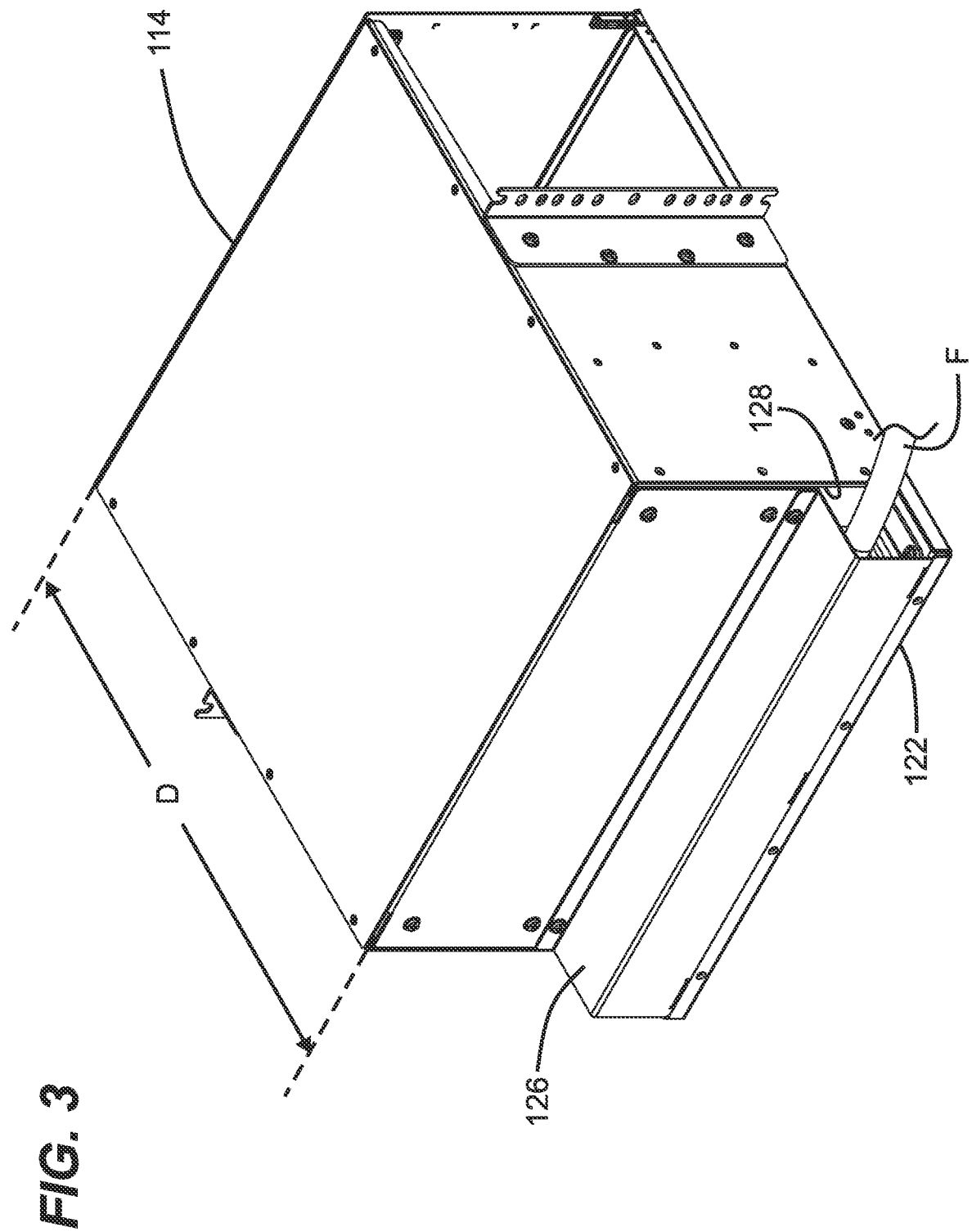
FIG. 3 is a rear perspective view of the communications panel of FIG. 1 showing a feeder cable routed to the rear of the communications panel.

As shown in FIG. 2, the ports 116, 117 are supported by a frame 150 disposed within the chassis 114. In some implementations, the frame 150 is disposed at the front 102 of the chassis 114. In other implementations, the frame 150 is disposed at an intermediate position along the depth D of the chassis 114, but is accessible from the front 102 of the chassis 114. In certain implementations, the frame 150 is stationary relative to the chassis 114.

Figure 10:
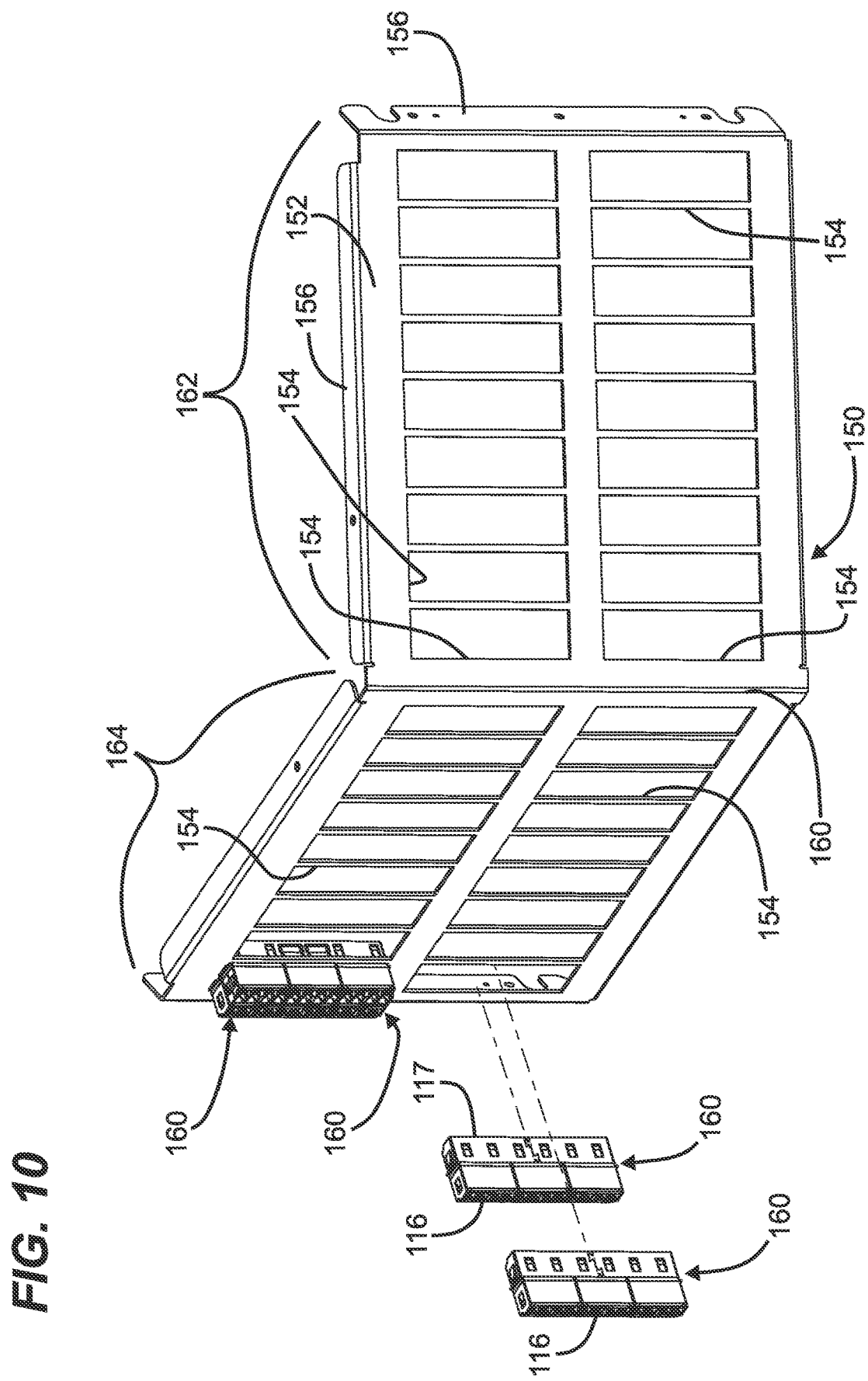
FIG. 10 is a perspective view of an example v-frame configured to hold a plurality of ports and to be mounted within the communications panel of FIGS. 1-7.

As shown in FIG. 10, the frame 150 includes a front face 152 that is accessible from the front 102 of the chassis 114. The front face 152 defines a plurality of apertures 154 at which the ports 116, 117 are mounted. For example, optical adapters defining the ports 116, 117 are mounted within the apertures 154. In certain examples, mounting flanges 156 extend rearwardly from the front face 152. In an example, fasteners extend through the mounting flanges 156 and into the walls of the chassis 114.

In certain implementations, the front face 152 of the frame 150 includes first and second angled sections 162, 164 that meet at an apex 160 at an intermediate location along the width W of the chassis 114. In the example shown, the first and second angled sections 162, 164 have a common length and the apex 160 is disposed at a center of the width W of the chassis 114. The first and second sections 162, 164 extend inwardly and forwardly from the sidewalls of the chassis 114 to the apex 160. In certain examples, the frame 150 forms a v-shape. Angling sections of the front face 152 increases the surface area at which the ports 116, 117 can be disposed compared to a front face extending straight along the width of the chassis 114.

In some implementations, the apertures 154 at the first angled section 162 are laterally aligned with the apertures 154 of the second angled section 164 along the width W of the chassis 114. In other implementations, the apertures 154 of the first angled section 162 are offset towards the top 110 or bottom 112 of the chassis 114 relative to the apertures 154 of the second angled section 164. In certain examples, the offset is less than the vertical height of one of the front ports 164. In certain examples, the offset is less than 0.1 inches. In certain examples, the offset is less than 0.09 inches. In certain examples, the offset is about 0.08 inches. In an example, the offset is about 0.08 inches.

Figure 11:
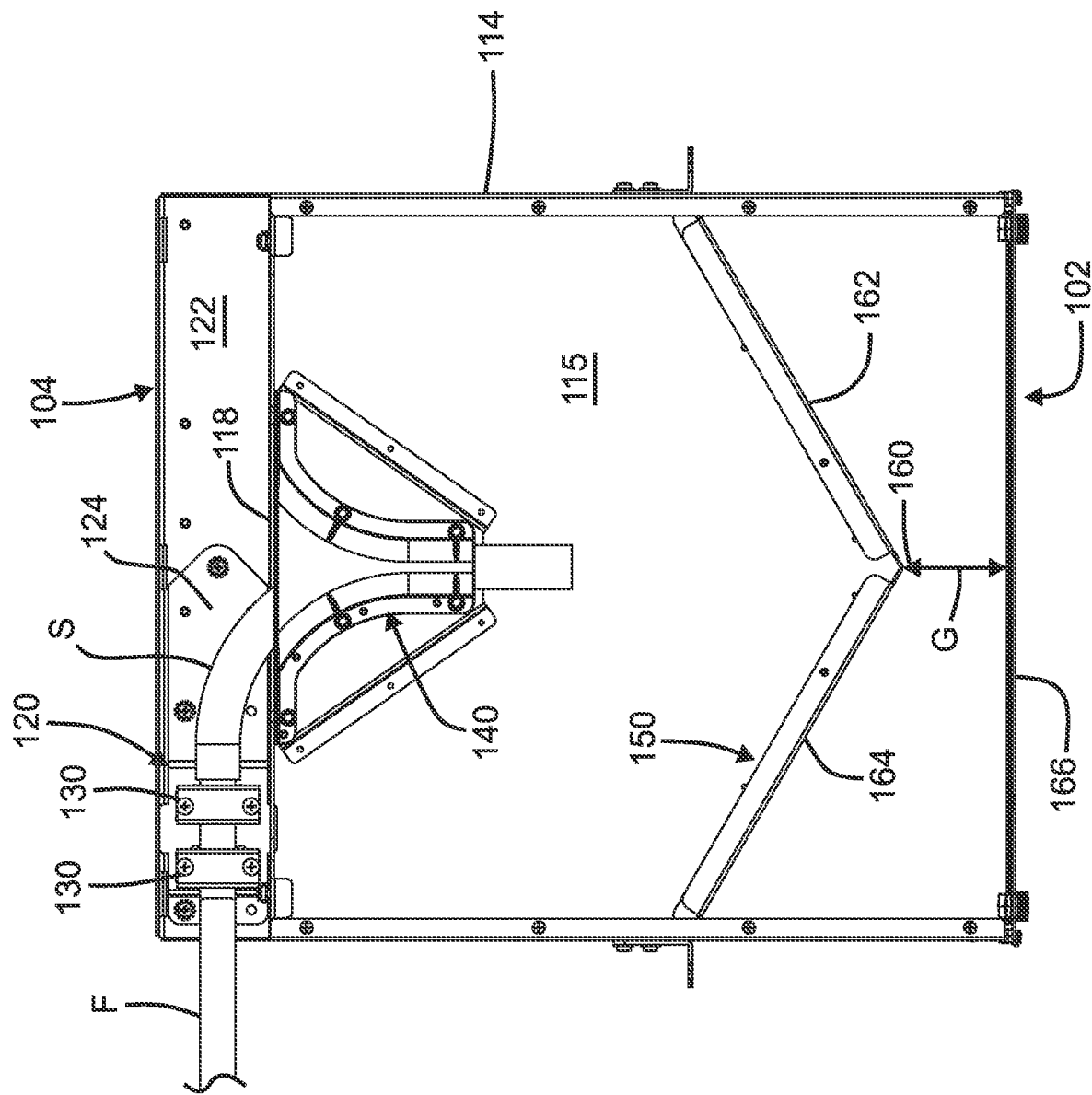
FIG. 11 is a top plan view of the communications panel of FIG. 5.

In certain implementations, the chassis 114 includes a front cover 166 that selectively extends across an open front of the chassis 114. The front cover 166 blocks access to the front ports 116 when the front cover 166 extends across the open front of the chassis 114. In some examples, the front cover 166 pivots to an open position to expose the front ports 116. In other examples, the front cover 166 is removable from the chassis 114. When the front cover 166 is disposed in the blocking position, the front cover 166 is spaced from the apex 160 of the frame 150 by a gap G (FIG. 11). The gap G provides space to accommodate cables extending from the front ports 116 of one angled section 162, 164 of the frame 150, across the apex 160 of the frame 150, and to the opposite side 106, 108 of the chassis 114.

Referring back to FIG. 10, in certain implementations, more than one front port 116 can be mounted at each of the apertures 154. In certain examples, a row or column of front ports 116 can be mounted at each of the apertures 154. For example, the aperture 154 can be sized to hold a row or column of two, four, six, eight, ten, or twelve front ports 116. In certain examples, multiple rows or columns of front ports 116 can be mounted at each aperture 154. In the example shown in FIGS. 2 and 10, two columns of optical adapters are disposed within each aperture 154. In certain examples, the optical adapters of the first column define front ports 116 oriented in a first direction and the optical adapters of the second column define front ports 116 flipped 180 degrees relative to the front ports 116 in the first column.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A communication panel comprising:
   a chassis including opposite first and second sides, a bottom, and a top extending along a forward-rearward axis between a front and a rear to define an interior;
   a cable guide extending through the rear of the chassis, the cable guide defining a cable passage leading between the interior of the chassis and an exterior of the chassis; and
   a cable anchor station disposed at the rear of the chassis, the cable anchor station including a support ledge and a mounting bracket, the support ledge extending outwardly from the rear of the chassis, the mounting bracket carrying at least one cable anchor, the mounting bracket being pivotally coupled to the support ledge to pivot relative to the chassis along a pivot arc between a first mounting position and a second mounting position, the mounting bracket defining a first cable routing path when disposed in the first mounting position and defining a second cable routing path when disposed in the second mounting position, the second cable routing path facing a different direction than the first cable routing path, wherein the first cable routing path guides a cable towards the first side of the chassis; and wherein the second cable routing path guides the cable towards the second side of the chassis.

2. The communication panel as claimed in claim 1, wherein the mounting bracket pivots relative to the support ledge about a pivot axis extending through the support ledge, and wherein a cable routing direction of the mounting bracket aligns with the cable passage of the cable guide at an intermediate location along the pivot arc.

3. The communication panel as claimed in claim 1, wherein the mounting bracket selectively secures to the support ledge in the first mounting position and in the second mounting position.

4. The communication panel as claimed in claim 3, wherein the mounting bracket is fastened to the support ledge in the first mounting position or the second mounting position.

5. The communication panel as claimed in claim 1, wherein the at least one cable anchor includes a cable clamp.

6. The communication panel as claimed in claim 1, wherein the at least one cable anchor includes a plurality of cable anchors.

7. The communication panel as claimed in claim 1, wherein the chassis defines a first rear slot towards the first side of the chassis and a second rear slot towards the second side of the chassis, and wherein the mounting bracket includes oppositely extending first and second tabs; wherein the first tab of the mounting bracket fits into the first rear slot of the chassis when the mounting bracket is disposed in the first mounting position and the second tab of the mounting bracket fits into the second rear slot of the chassis when the mounting bracket is disposed in the second mounting position.

8. The communication panel as claimed in claim 1, wherein the cable guide has a first bend radius limiting surface disposed between the cable passage and the first side of the chassis and a second bend radius limiting surface disposed between the cable passage and the second side of the chassis.

9. The communication panel as claimed in claim 1, wherein the cable guide has a top guide surface that is spaced from the top of the chassis along a majority of a height of the chassis.

10. The communication panel as claimed in claim 1, wherein the cable guide defines a trumpet shape with a mouth that is elongate between the first and second sides of the chassis.

11. The communication panel as claimed in claim 1, wherein the cable guide is formed from multiple pieces.

12. The communication panel as claimed in claim 1, further comprising a cover that mounts to the support ledge to cover the first cable routing path and/or the second cable routing path.

13. The communication panel as claimed in claim 12, wherein the cover is removable to provide access to the first cable routing path and/or the second cable routing path.

14. The communication panel as claimed in claim 1, further comprising;
   a plurality of optical adapters disposed at the chassis, the optical adapters defining front ports accessible at the front of the chassis and rear ports accessible from within the interior of the chassis; and
   a frame mounted at the front of the chassis, the frame holding the optical adapters, the frame having a v-shape.

15. The communication panel as claimed in claim 14, wherein the plurality of optical adapters includes at least 576 ports per 5 RU.

16. The communication panel as claimed in claim 15, wherein the plurality of optical adapters includes at least 864 ports per 5 RU.

17. The communication panel as claimed in claim 1, further comprising a v-shaped frame mounted to the chassis, the v-shaped frame having an apex that is disposed farthest forward along the forward-rearward axis than outer sides of the frame, the v-shaped frame carrying a plurality of front ports accessible from the front of the chassis.

18. The communication panel as claimed in claim 17, wherein the front ports include a first group of front ports disposed at a first side of the frame between the apex and a first of the outer sides of the frame and a second group of front ports disposed at a second side of the frame between the apex and a second of the outer sides of the frame; wherein the front ports of the first group are vertically offset towards the top or bottom of the chassis relative to the front ports of the second group.

19. The communication panel as claimed in claim 17, further comprising a front cover that selectively extends across an open front of the chassis, the front cover also extending across the apex of the frame at a location faced forward of the apex of the frame when the front cover extends across the open front of the chassis.

20. The communication panel as claimed in claim 1, further comprising a cable routed to the rear of the chassis, the cable being anchored to the mounting bracket of the cable anchor station, the cable extending through the cable passage of the cable guide and into the interior of the chassis, the cable being slideable relative to the cable guide while anchored to the mounting bracket.

21. The communication panel as claimed in claim 1, wherein the support ledge extends between the first and second sides of the chassis; and wherein the pivot arc is parallel with the support ledge.

22. The communication panel as claimed in claim 1, wherein the cable passage of the cable guide has a wider end raised relative to a narrower end of the cable passage.

23. The communication panel as claimed in claim 1, further comprising a rear panel covering a majority of the rear of the chassis, the rear panel being removable to provide access to the interior of the chassis through the rear of the chassis.

24. A communication panel comprising:
a chassis including opposite first and second sides, a bottom, and a top extending along a forward-rearward axis between a front and a rear to define an interior, wherein the chassis defines a first rear slot towards the first side of the chassis and a second rear slot towards the second side of the chassis;
a cable guide extending through the rear of the chassis, the cable guide defining a cable passage leading between the interior of the chassis and an exterior of the chassis; and
a cable anchor station disposed at the rear of the chassis, the cable anchor station including a support ledge and a mounting bracket, the support ledge extending outwardly from the rear of the chassis, the mounting bracket carrying at least one cable anchor, the mounting bracket being pivotally coupled to the support ledge to pivot relative to the chassis along a pivot arc between a first mounting position and a second mounting position, the mounting bracket defining a first cable routing path when disposed in the first mounting position and defining a second cable routing path when disposed in the second mounting position, the second cable routing path facing a different direction than the first cable routing path, wherein the mounting bracket includes oppositely extending first and second tabs; wherein the first tab of the mounting bracket fits into the first rear slot of the chassis when the mounting bracket is disposed in the first mounting position and the second tab of the mounting bracket fits into the second rear slot of the chassis when the mounting bracket is disposed in the second mounting position.

25. A communication panel comprising:
a chassis including opposite first and second sides, a bottom, and a top extending along a forward-rearward axis between a front and a rear to define an interior;
a cable guide extending through the rear of the chassis, the cable guide defining a cable passage leading between the interior of the chassis and an exterior of the chassis, wherein the cable guide has a first bend radius limiting surface disposed between the cable passage and the first side of the chassis and a second bend radius limiting surface disposed between the cable passage and the second side of the chassis; and
a cable anchor station disposed at the rear of the chassis, the cable anchor station including a support ledge and a mounting bracket, the support ledge extending outwardly from the rear of the chassis, the mounting bracket carrying at least one cable anchor, the mounting bracket being pivotally coupled to the support ledge to pivot relative to the chassis along a pivot arc between a first mounting position and a second mounting position, the mounting bracket defining a first cable routing path when disposed in the first mounting position and defining a second cable routing path when disposed in the second mounting position, the second cable routing path facing a different direction than the first cable routing path.

26. A communication panel comprising:
a chassis including opposite first and second sides, a bottom, and a top extending along a forward-rearward axis between a front and a rear to define an interior;
a cable guide extending through the rear of the chassis, the cable guide defining a cable passage leading between the interior of the chassis and an exterior of the chassis, wherein the cable guide defines a trumpet shape with a mouth that is elongate between the first and second sides of the chassis; and
a cable anchor station disposed at the rear of the chassis, the cable anchor station including a support ledge and a mounting bracket, the support ledge extending outwardly from the rear of the chassis, the mounting bracket carrying at least one cable anchor, the mounting bracket being pivotally coupled to the support ledge to pivot relative to the chassis along a pivot arc between a first mounting position and a second mounting position, the mounting bracket defining a first cable routing path when disposed in the first mounting position and defining a second cable routing path when disposed in the second mounting position, the second cable routing path facing a different direction than the first cable routing path.

* * * * *